June 6, 1939.　　　J. A. SMITMANS　　　2,161,768
SLEEVE-TYPE ROLLING BEARING

Filed Nov. 4, 1937　　　3 Sheets-Sheet 2

INVENTOR.
John A. Smitmans
BY Joe. E. Dickinson
ATTORNEY.

June 6, 1939.  J. A. SMITMANS  2,161,768
SLEEVE-TYPE ROLLING BEARING
Filed Nov. 4, 1937  3 Sheets-Sheet 3
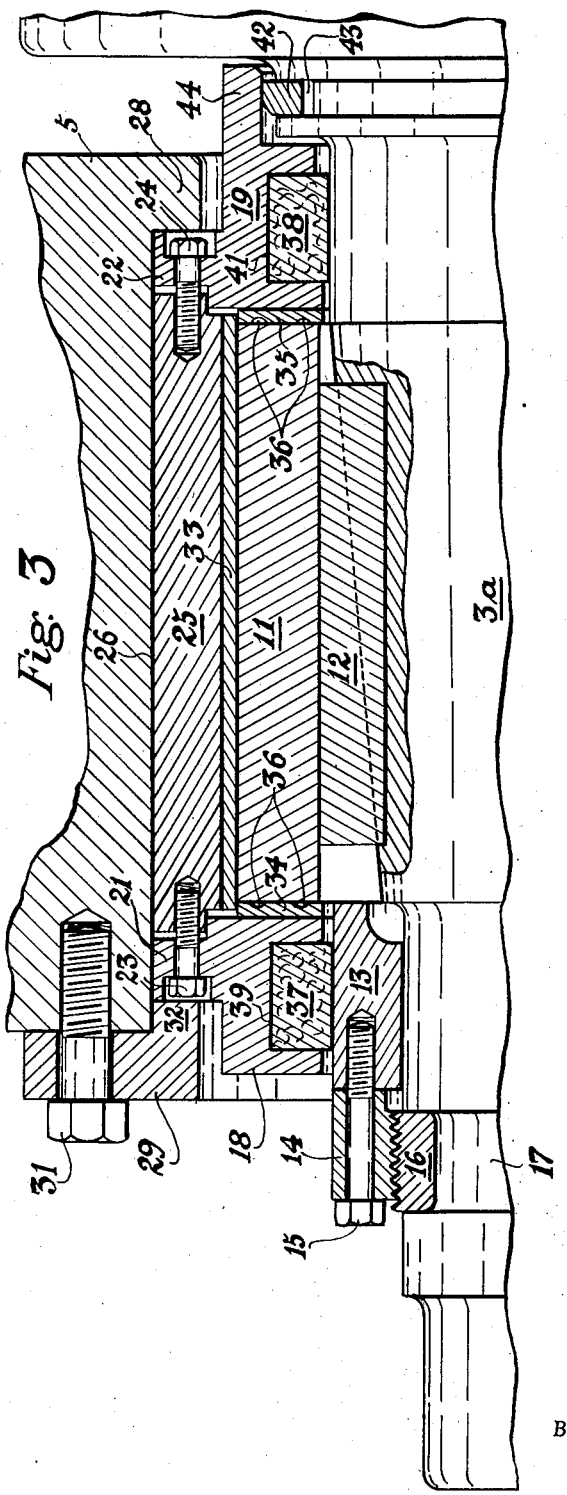
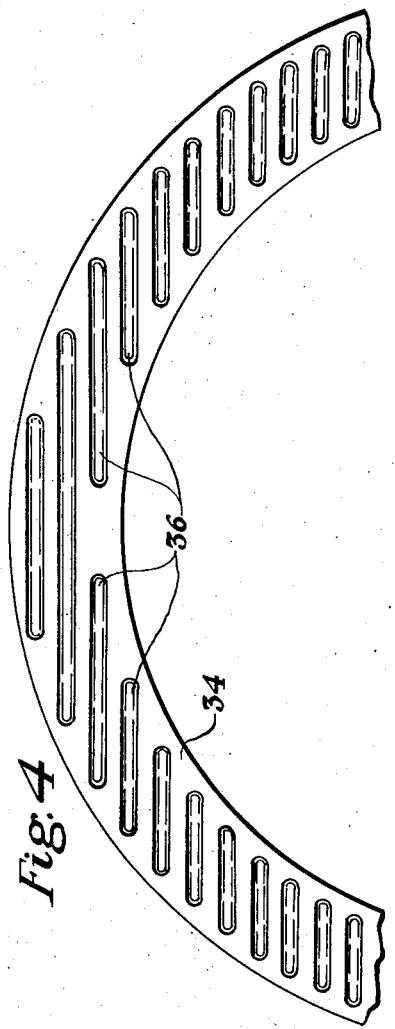
INVENTOR.
John A. Smitmans
BY Jos. E. Dickinson
ATTORNEY.

Patented June 6, 1939

2,161,768

UNITED STATES PATENT OFFICE 2,161,768

SLEEVE-TYPE ROLLING BEARING

John A. Smitmans, Pittsburgh, Pa., assignor to United Engineering and Foundry Company, Pittsburgh, Pa., a corporation of Pennsylvania Application November 4, 1937, Serial No. 172,656

9 Claims. (Cl. 308—36.1)

This invention relates to bearings, and more particularly to a sleeve bearing for use on the necks of rolling mill rolls in which an oil film is maintained between the bearing surfaces to minimize the friction of the bearing.

An object of the invention is to provide a bearing of this character which is simple of construction, relatively easy to manufacture and install, and adapted to be interchangeably used on the necks at the two ends of a roll.

Another object is to provide in such a bearing for preventing the loss of pressure in the oil film at the ends of the bearing sleeve.

A further object is to provide a bearing construction of this type which may be assembled and disassembled as a unit.

Figure 1:
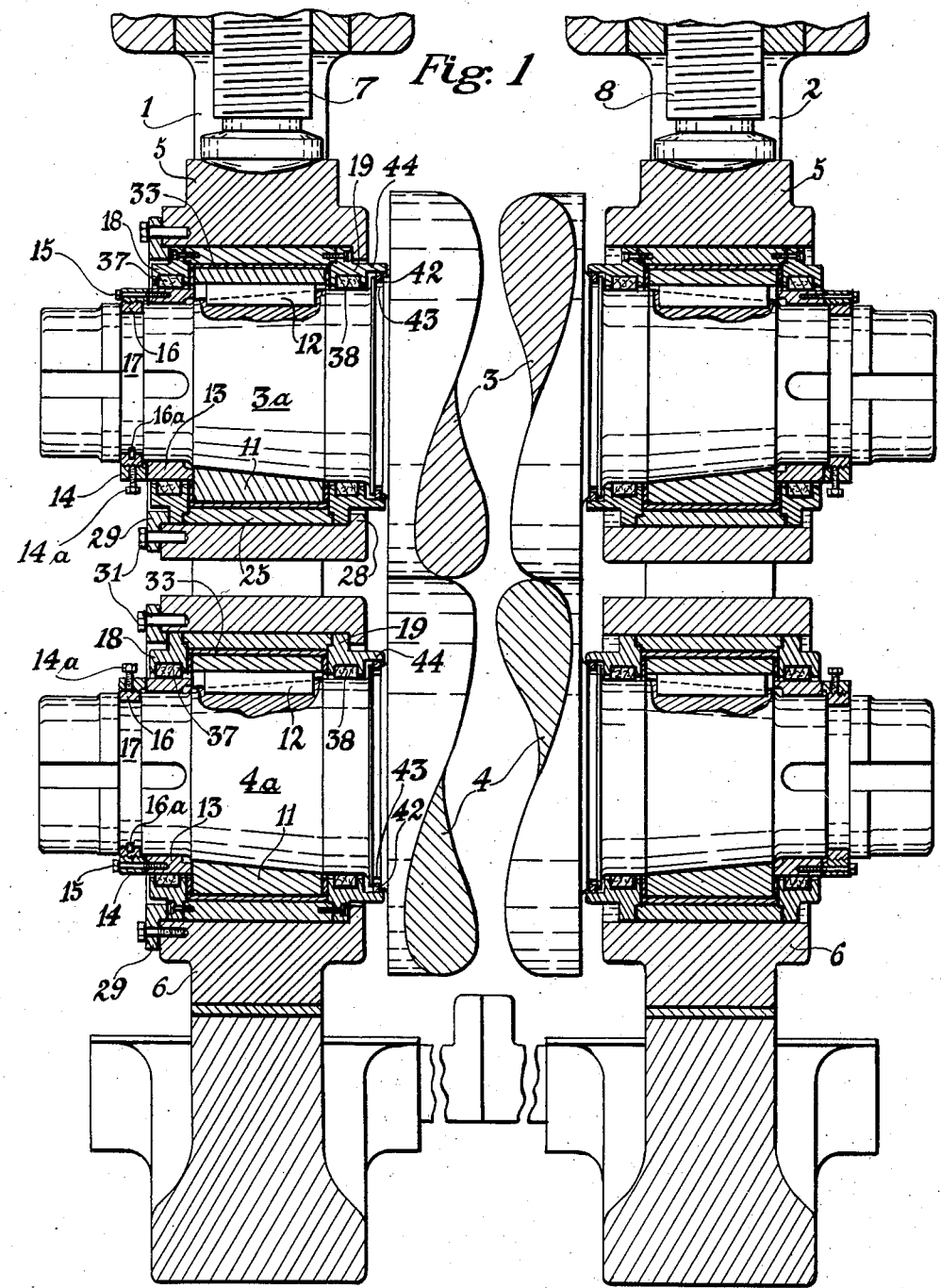
Figure 2:
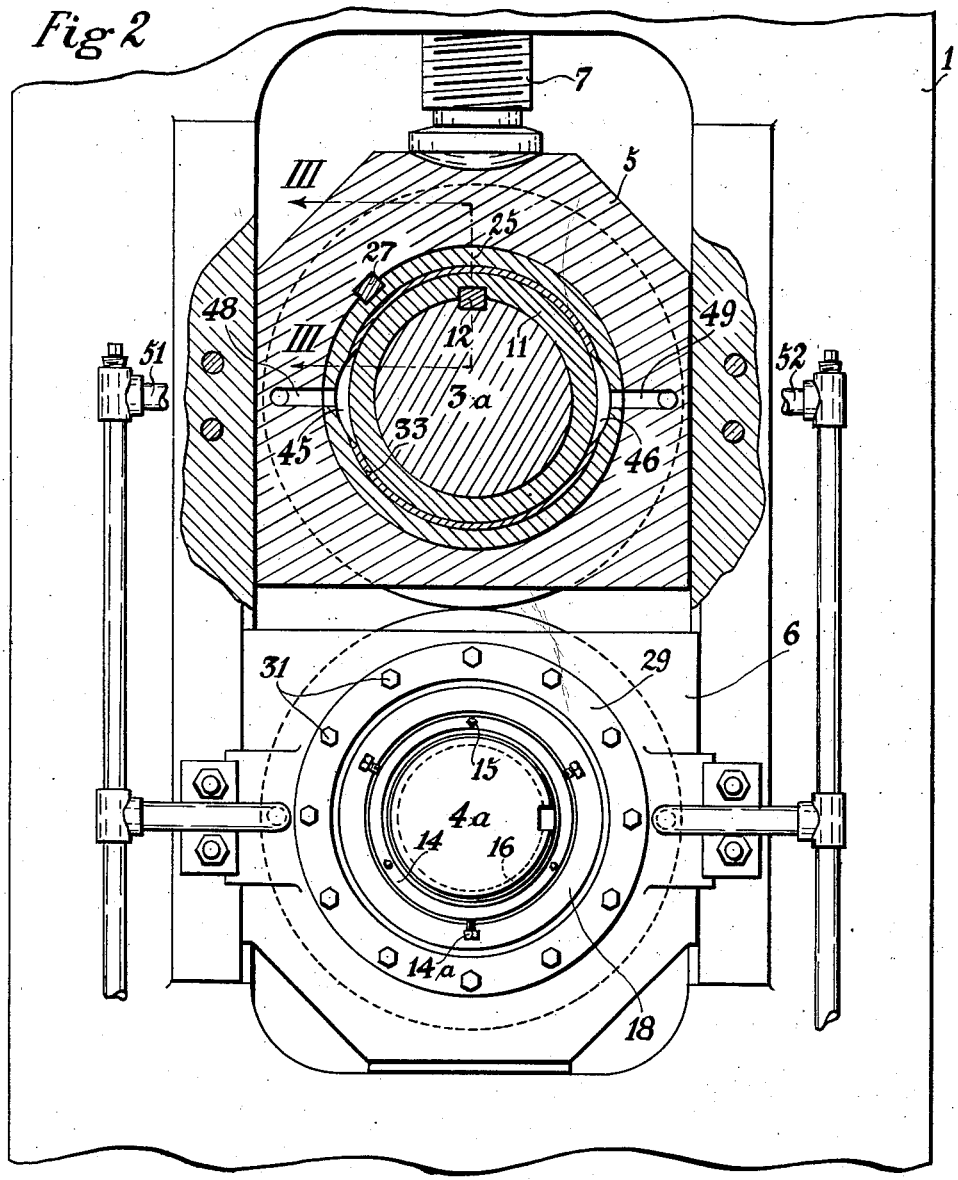

These and various other objects as well as the various other novel features and advantages of the invention will be apparent when the following detailed description is read in conjunction with the accompanying drawings of which Fig. 1 is a sectional view of a mill housing and roll assembly equipped with roll neck bearings constructed in accordance with this invention; Fig. 2 an end view partly in section and partly in elevation of the same assembly; Fig. 3 a sectional view to enlarged scale taken on the line III—III of Fig. 2; and Fig. 4 a fragmentary face view of one of the sealing gaskets provided at the ends of the bearing sleeve mounted on the roll neck.

Referring in detail to the drawings the numerals 1 and 2 designate the roll housings and the numerals 3 and 4 the rolls of a rolling mill which, although shown as a 2-high mill, may be any form or type of mill. As illustrated, the necks 3a and 4a of the rolls 3 and 4 are supported in a conventional manner in chucks 5 and 6 fitted in the housing windows, and for adjusting these chucks the housings are equipped with the customary screws 7 and 8.

In accordance with the invention similar bearing assemblies are provided on each of the roll necks 3a and 4a and each of these assemblies comprises a sleeve 11 made of steel or other suitable wear-resisting material which is slid on and keyed to the roll neck for rotation therewith by means of a suitable key 12. While in the present embodiment the roll neck and interior of sleeve 11 are tapered to facilitate the assembly of the bearing, it is to be understood that this taper may be dispensed with as desired. To prevent endwise removal of the sleeve 11 an end-thrust collar or ring 13 is placed on the roll neck to engage the outer end of the sleeve and is itself held against both rotation and outward movement by a locking ring 14 and screws 15, the latter ring 14 being threaded over an exteriorly threaded split ring 16 which is in turn mounted in a groove 17 provided for its reception in the roll neck. In order that the locking rings 14 and split rings 16 be prevented from turning on the roll necks 3a and 4a respectively, set screws 14a are carried by the locking rings to fix their relative positions with respect to the split rings 16, the latter by means of keys 16a being prevented from turning with respect to the roll necks.

At the opposite ends of the neck sleeve 11 there is provided a pair of retaining rings 18 and 19 which are disposed to engage the end faces of such sleeve and ride on the periphery of the thrust ring 13 and the inner surface of the roll neck, respectively. The peripheries of these retainer rings are provided with ribs 21 and 22 which are secured by a plurality of spaced screw bolts 23 and 24 to an outer or chuck bearing sleeve 25 which is fitted in the bore 26 of the bearing supporting chuck and held against rotation therein by a key 27. To hold the roll in place in the supporting chuck one of them, as shown in Fig. 1, is provided with an inwardly projecting flange 28 at the inner end of the bore 26 therein to engage the rib 22 on the periphery of the sealing ring 19 and prevent inward movement of the assembly, while a clamping ring 29 is secured by spaced bolts 31 to the outer face of the chuck and provided with an inwardly projecting flange 32 which is disposed to engage the outer face of the rib 21 on the periphery of sealing ring 18 and prevent outward movement of the assembly. As an alternative, as will be appreciated, both bearings may be similarly held in the chucks and one of the chucks adapted for movement in the housing window.

To increase the life and efficiency of the bearing a replaceable split intermediary sleeve 33 made of some suitable bearing material such as babbitt is preferably provided between the sleeves 11 and 25, and between the ends of the inner or neck bearing sleeve 11 and the abutting faces of the retaining rings 18 and 19 there is arranged a pair of ring-shaped bearing gaskets 34 and 35 which are also made of some suitable bearing material such as babbitt. The principal purpose of these end gaskets is to prevent the escape of the oil film pressure at the ends of the bearing sleeve and thereby maintain the effective area of such film at a maximum. To accomplish such purpose they are fitted snugly against the end of the sleeve and provided as shown in Figs. 3 and 4 with a plurality of preferably horizontally disposed grooves 36 which are spaced from each other and from the edges of the rings, the object of the grooves being to resist the flow of the lubricant across the ends of the bearing sleeve.

To prevent the lubricant from escaping from the ends of the bearing assembly suitable packing glands 37 and 38 are mounted in grooves 39 and 41 provided therefor in the inner surfaces of the retainer rings 18 and 19 and disposed to sealably engage the peripheries of the end-thrust ring 13 and the roll neck respectively. In addition to these seals an expansible sealing ring 42 is fitted in a receiving groove 43 provided therefor at the inner end of the roll neck, such ring being disposed with its periphery in running contact with an axially extending rib 44 provided on the inner end of the sealing ring 19 which with the ring 42 provides a seal for preventing the influx of water or other foreign material from the mill into the bearing assembly.

For supplying the bearing with oil or other similar lubricant and to permit its egress therefrom axially disposed chambers 45 and 46 are formed in the outer and intermediary bearing sleeves 25 and 33 at the two sides of the inner bearing sleeve 11 opposite the center-line of the latter where the bearing pressure of the assembly is at a minimum. These chambers are formed by cutting away the intermediary bearing sleeve and the outer bearing sleeve across the full length of the inner sleeve, and communicating with them are suitable ducts 48 and 49 to which supply and discharge pipes 51 and 52 are connected. While not shown, the latter are in turn connected to a suitable source of pressure supply and discharge reservoir.

When the roll is rotated the oil is drawn due to suction by the rotation of the neck sleeve 11 between it and the intermediary sleeve 33, a sufficient pressure being thereby built up to maintain a constant film of oil between these bearing surfaces whereby greatly reducing the frictional resistance of the bearing. To attain such end the clearance between the bearing sleeves is of course reduced to an operating minimum, and to prevent loss of pressure of the oil film at the two ends of the bearing to thereby maintain the effective area of the film at a maximum the sleeve-end-engaging gaskets 34 and 35 provided with the flow-resisting grooves 36 are employed, and to function properly these are held as tightly against the ends of the sleeve 11 as is permissible. To so adjust them a sufficient clearance is provided between the ends of the sleeve 25 and the ribs 21 and 22 of the retaining rings 18 and 19 to permit the latter to be forced tightly against the ends of the sleeve 11 by the bolts 23 and 24. Preferably in assembling the bearing these bolts are tightened so as to firmly lock the sealing rings 18 and 19 against the ends of the sleeve 11, and then after the bearing is in place these bolts are loosened only sufficiently to prevent free movement of the sleeve, thereby adapting the oil rings 34 and 35 to function with the highest efficiency.

As will be appreciated, due to the construction of this bearing it can be interchangeably and readily applied as a unit to the necks at both ends of the rolls and also easily replaced.

According to the provisions of the patent statutes, I have explained the construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A roll neck bearing assembly comprising a roll neck supporting chuck having a bore therein for receiving a roll neck, a bearing sleeve adapted to be attached to and held against relative movement on a roll neck and to fit closely in said bore, means for supplying a lubricant to the contacting bearing surfaces of said chuck and sleeve, and means for slidably engaging the opposite ends of said sleeve which are adapted to resist the dissipation of the pressure of the lubricant film between the sleeve and chuck at the ends of the sleeve.

2. A roll neck bearing assembly comprising a roll neck supporting chuck having a bore therein for receiving a roll neck, a bearing sleeve adapted to be attached to and held against relative movement on a roll neck and to fit closely in said bore, means for supplying a lubricant to the contacting bearing surfaces of said chuck and sleeve, and means for slidably engaging the opposite ends of said sleeve which are adapted to both hold it against endwise movement relative to the chuck bearing surface and resist the dissipation of the lubricant film between the sleeve and chuck at the end of the sleeve.

3. A roll neck bearing comprising an outer bearing sleeve adapted to be mounted in a roll supporting chuck, an inner bearing sleeve adapted to be fitted to and held against relative rotary or endwise movement on a roll neck and fitted in said outer sleeve, and retainer means firmly secured to the ends of said outer sleeve and slidably engaging the ends of said inner sleeve.

4. A roll neck bearing comprising an outer bearing sleeve adapted to be fitted in a roll supporting chuck, an inner sleeve which is adapted to be attached to the roll neck and fitted in said outer sleeve, retaining rings attached to the ends of said outer sleeve and disposed to bear against the ends of said inner sleeve, means for supplying a lubricant to the bearing surfaces of said sleeves, and means between said retaining ring and the end faces of said inner sleeve for resisting the escape of the pressure of the lubricating film at the outer edges of said sleeves.

5. A roll neck bearing assembly comprising a roll neck supporting chuck having a bore therein for receiving a roll neck, a bearing sleeve adapted to fit in said bore, means for holding said sleeve against rotation in said bore, an inner sleeve disposed to fit in said outer sleeve, means for releasably attaching said inner sleeve to a roll neck and preventing endwise movement thereof relative to the roll neck, means for supplying a lubricant to the contacting surfaces of said sleeves across the entire length thereof, retainer members mounted at the ends of said sleeves being attached to the outer sleeve and urged against the end faces of the inner one, means for supplying a lubricant between said sleeves across the length thereof, and means between said retainer members and the ends of said inner sleeve for maintaining the pressure of the lubricant film between the sleeves at a maximum at the ends of the sleeves.

6. A roll neck bearing assembly comprising a roll neck supporting chuck having a bore therein for receiving a roll neck, a bearing sleeve mounted on and keyed to a roll neck fitted in said bore, a retainer ring fitted tightly against the outer end of said sleeve and held against endwise movement on said roll neck, an outer sleeved fitted over said inner sleeve and secured against rotation in said bore, a pair of retainer rings arranged at the ends of said sleeves, bearing liners fitted between said sleeves and the ends of said inner sleeve and said retainer rings, means for securing said retainer rings to the ends of said outer sleeve and clamping them against the ends of said inner sleeve, and means for holding said sleeve assembly against endwise movement in said chuck.

7. A roll neck bearing assembly comprising a roll neck supporting chuck having a bore therein for receiving the roll neck, an outer bearing sleeve held against rotation in said bore, an inner bearing sleeve mounted for rotation on the roll neck and fitted snugly in said outer sleeve, releasable means for preventing axial movement of the inner sleeve on the roll neck, means for supplying lubricant to the bearing surfaces of said sleeves across the full length thereof, retaining means clamped against the ends of said sleeve and operable to prevent relative axial movement of the two and the loss of pressure of the lubricant at the ends of the sleeves, and sealing means for preventing the escape of lubricant at the ends of the assembly.

8. A roll neck bearing assembly comprising a roll neck supporting chuck having a bore therein for receiving the roll neck, an outer bearing sleeve held against rotation in said bore, an inner bearing sleeve firmly secured against relative axial or rotative movement on said roll neck and snugly fitted in said outer sleeve, means for supplying a lubricant to the bearing surfaces of said sleeves across the full length thereof, means firmly secured to the ends of said outer sleeve and pressed against the ends of said inner sleeve to prevent relative endwise movement of the two sleeves and the loss of oil pressure at the ends of the sleeves to thereby maintain the effective area of the oil film between the sleeves at a maximum, and sealing means for preventing the escape of lubricant from the ends of the assembly.

9. A roll neck bearing assembly comprising a roll neck supporting chuck having a bore therein for receiving the roll neck, an outer bearing sleeve mounted in said bore and releasably held against relative movement therein, an inner bearing sleeve releasably secured against rotation and endwise movement on the roll neck and fitted in said outer sleeve, a bearing liner disposed between said sleeves and forming a close fit therewith, means for supplying a lubricant to the bearing surfaces between said liner and inner sleeve across the full length thereof, retainer means disposed to engage the ends of said inner sleeve firmly and adjustably secured to the ends of said outer sleeve, bearing gaskets provided with flow-resisting grooves in the sleeve-engaging surfaces thereof disposed between said retainer means and the ends of said inner sleeve, and sealing means for preventing the escape of lubricant from the ends of said assembly.

JOHN A. SMITMANS.